United States Patent [19]
Hewitt

[11] 3,831,998
[45] Aug. 27, 1974

[54] AUTOMOBILE CONSTRUCTION FOR SAFETY OF OCCUPANTS

[76] Inventor: Harlan D. Hewitt, 1210 Astor St., Chicago, Ill. 60610

[22] Filed: Mar. 13, 1972

[21] Appl. No.: 234,080

[52] U.S. Cl............. 296/35 R, 180/82 R, 180/91, 280/87 R, 293/63
[51] Int. Cl..................... B62d 1/18, B62d 27/06
[58] Field of Search........... 296/35 R; 180/82 R, 91; 280/87 R, 87 A; 293/62-67; 74/492, 493

[56] References Cited
UNITED STATES PATENTS

| | | | |
|---|---|---|---|
| 2,929,637 | 3/1960 | Papacosta | 296/65 A X |
| 3,162,479 | 12/1964 | Hewitt | 296/35 R |
| 3,219,384 | 11/1965 | Graham | 296/28 R |
| 3,329,040 | 7/1967 | Stein | 74/492 X |
| 3,479,080 | 11/1969 | Hilfiker | 296/35 R |
| 3,508,783 | 4/1970 | Schlanger | 296/35 R |
| 3,575,454 | 4/1971 | Meeker | 296/35 R X |

Primary Examiner—Robert J. Spar
Assistant Examiner—Leslie J. Paperner
Attorney, Agent, or Firm—William F. Anderson

[57] ABSTRACT

A safety construction for vehicles wherein a separable passenger compartment is releasably secured to a chassis, a bumper and chassis interlock tie colliding vehicles together as a unit, and a sectioned steering post collapses upon separation of the passenger compartment from the chassis.

9 Claims, 13 Drawing Figures

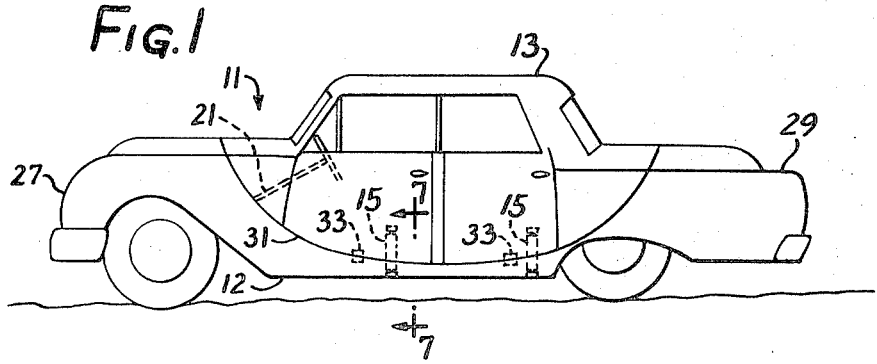
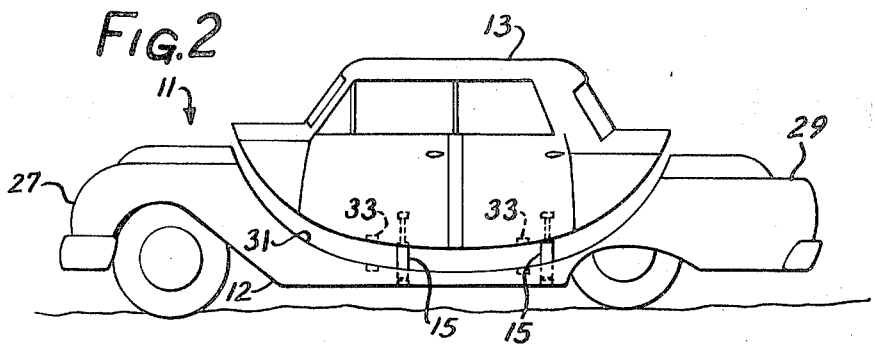
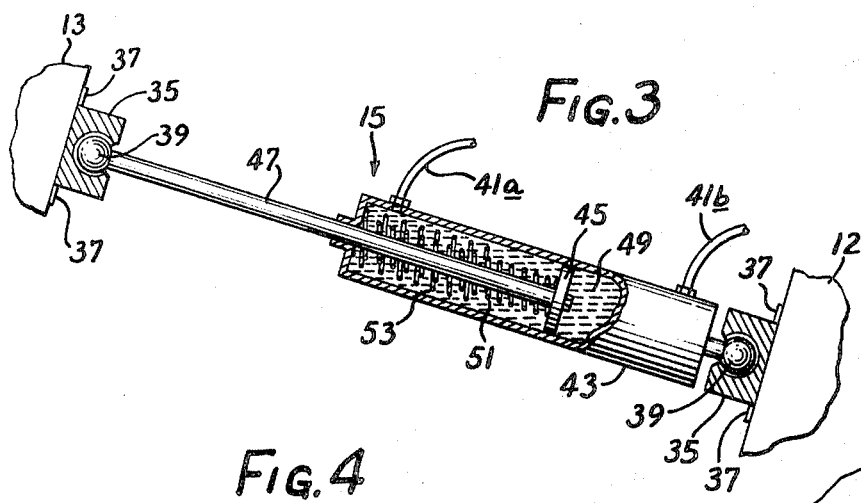
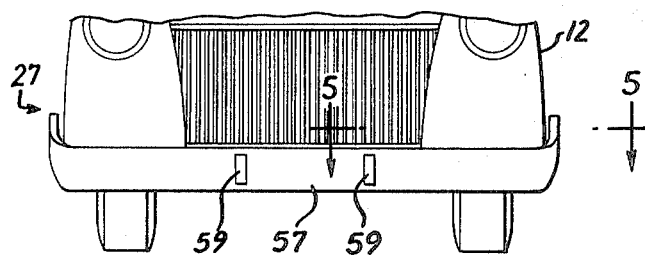
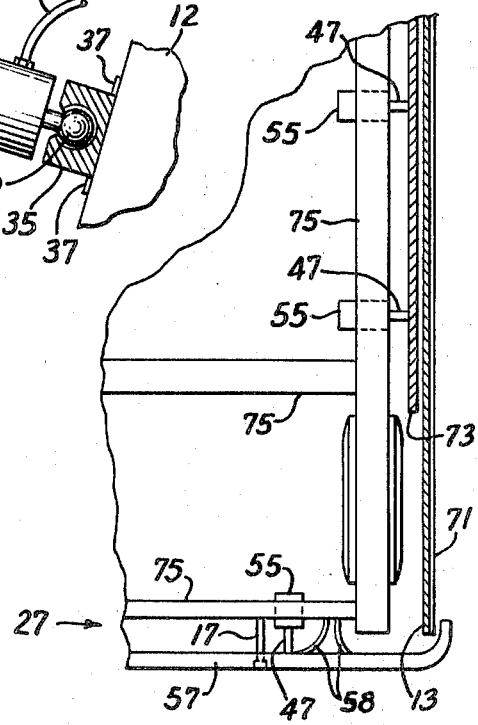

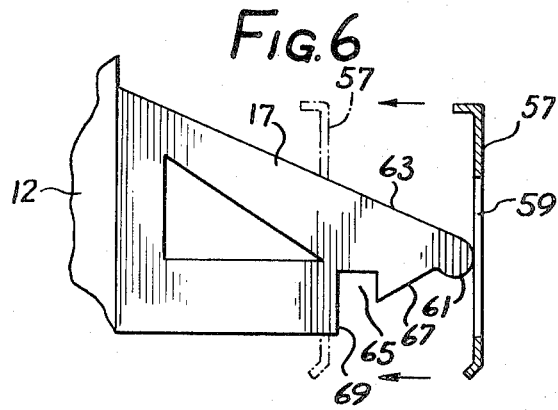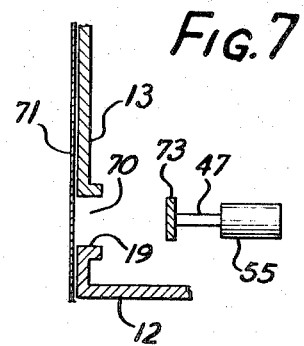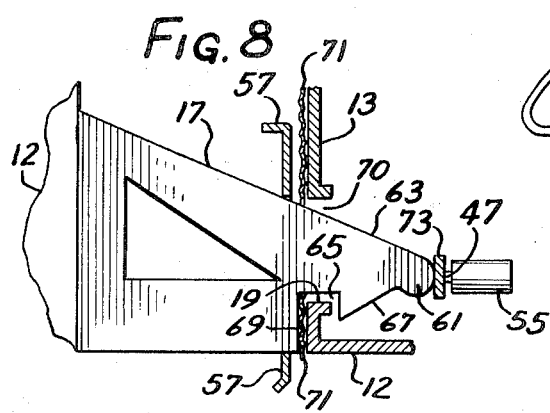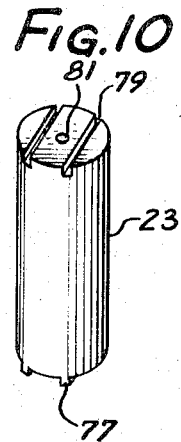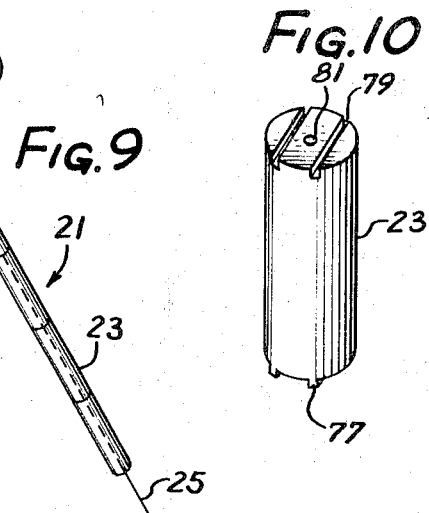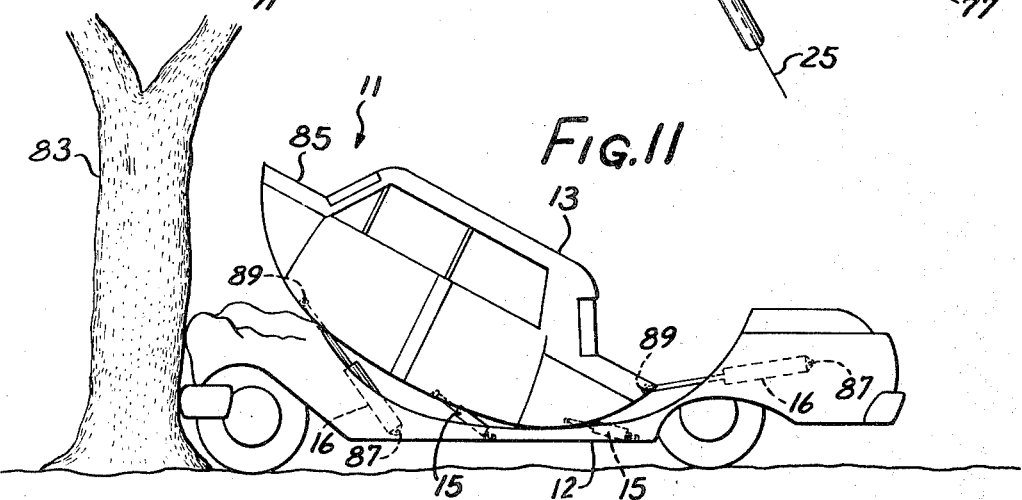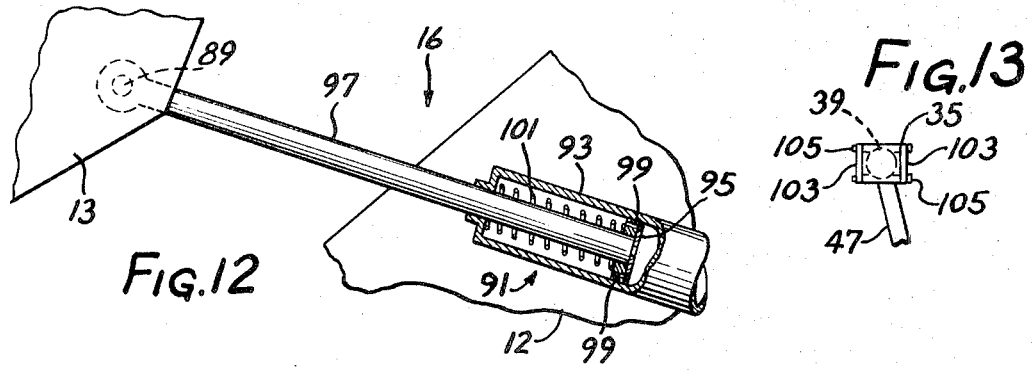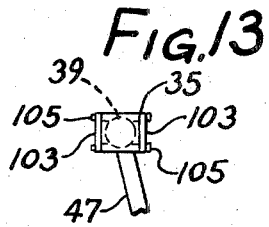

AUTOMOBILE CONSTRUCTION FOR SAFETY OF OCCUPANTS

This invention relates to a safety construction for vehicles. More particularly, it relates to a safety construction that is specifically designed to protect occupants of a vehicle in the event of a high speed impact or collision.

Modern vehicles with their large displacement engines and high horsepower ratings have tended to increase the dangers to life and limb of the driver and of passengers of these vehicles.

Recently manufacturers have developed certain safety devices which are designed to reduce injury to occupants when the vehicle in which they are riding is involved in a high speed collision or impact. More specifically, automotive manufacturers have provided such safety features as padded dashboards and sun visors, collapsible steering columns, and seat belts.

Unfortunately, such safety features have had limited effectiveness. Use of these safety devices in an automobile, for example, has tended to reduce serious or fatal injuries to occupants where the collision or impact takes place at reduced speeds. In instances of high speed impact, however, these devices have sometimes been ineffective in preventing serious injury. This ineffectiveness can be attributed in most instances to the occupants being thrown forward at a velocity approximately equal to that of the vehicle prior to impact during the time that the vehicle in which they are riding is subjected to substantially instantaneous deceleration to zero velocity. For example, upon a head-on impact, the front end components of the vehicle absorb the kinetic energy of the vehicle, and it can be understood that there must also be something to absorb the kinetic energy of the driver and passengers so as to decelerate them safely after impact. Padded dashboards and seat belts are not suitable at high speeds for decelerating the passengers at a rate at which the shock of rapid deceleration may be absorbed without harm to persons.

An improved vehicle for minimizing injury to passengers under such circumstances is disclosed and claimed in my prior U.S. Pat. No. 3,162,479, issued Dec. 22, 1964. A further improvement thereon is the safety seat for automobile disclosed and claimed in my more recent U.S. Pat. No. 3,423,124, issued Jan. 21, 1969. The present application is directed toward further improvements on these two patents.

Accordingly, it is an object of the present invention to provide an improved construction for vehicles to reduce the incidence of injury to occupants of the vehicle by activating safety devices automatically in a prescribed hazardous situation without dependence on any defensive act of the occupants of the vehicles.

Another object of the present invention is to provide a safety construction for vehicles in which the passenger compartment is released from the chassis upon a high speed impact at substantially any point around the perimeter of the chassis to safely decelerate the occupants in the passenger compartment after impact.

A further object of the present invention is to provide a safety construction for vehicles in which a vehicle striking another broadside becomes interlocked with the struck vehicle so that the two vehicles come to rest as one unit.

Yet another object of the present invention is to provide a safety construction for vehicles in which the steering column collapses upon release of the passenger compartment from the chassis of the vehicle.

These and other objects of the present invention are more particularly set forth in the following detailed description and in the accompanying drawings of which:

FIG. 1 is a side elevational view of a vehicle in which various features of the present invention are illustrated;

FIG. 2 is a side elevational view of the vehicle of FIG. 1 in which the passenger compartment is separated from the chassis;

FIG. 3 is a fragmentary view of a portion of the underside of the vehicle of FIG. 1 illustrated with a part broken away;

FIG. 4 is a fragmentary view of the front of the vehicle of FIG. 1;

FIG. 5 is a fragmentary view partly in section of a portion of the vehicle taken substantially along the line 5—5 of FIG. 4;

FIG. 6 is an elevational view partly in section illustrating in detail a front portion of the vehicle of FIG. 1;

FIG. 7 is a fragmentary end view partly in section of a portion of the vehicle taken along the line 7—7 of FIG. 1;

FIG. 8 is a fragmentary elevational view partly in section of the portions of FIGS. 6 and 7 interlocking relationship;

FIG. 9 is a fragmentary schematic view of the steering column of the vehicle of FIG. 1;

FIG. 10 is a perspective view of a section of the steering column of FIG. 9 enlarged for clarity of illustration;

FIG. 11 is a side elevational view of the vehicle of FIG. 1 illustrating an alternative construction;

FIG. 12 is a fragmentary detail with a part broken away of a portion of the vehicle of FIG. 11; and FIG. 13 is a fragmentary detail of a portion of the vehicle of FIG. 11.

Very generally, the preferred embodiment is illustrated in the aforementioned figures and includes an automotive vehicle 11 comprising a chassis 12, a passenger compartment 13 releasably secured to the chassis and four separating devices 15 (only two illustrated in FIG. 2) connecting the passenger compartment and the chassis. When a high speed collision occurs between vehicles, the passenger compartment breaks away from its fixed position on the chassis and "floats" above the chassis so that it is movable independently of and in relation to the chassis. The separating devices 15 restrain the movement of the passenger compartment 13 and absorb any kinetic energy imparted to the passenger compartment. Such action significantly reduces the forces to which occupants of the passenger compartment are subjected as a result of the impact and in this manner significantly reduces or prevents serious or fatal injuries. In an alternative construction, shock cushioning elements 16 (FIG. 11) are provided to restrain the movement of the compartment and absorb kinetic energy having a direction of force longitudinally of the vehicle. In this instance, the devices 15 are separated from their mountings. The restraint then resides in the elements 16.

An interlocker hook 17 (FIG. 6) is mounted on the front end of the chassis 12 and is adapted to interlock with an interlocker lip 19 (FIG. 7) of the chassis. As will be seen in detail hereinafter, when the front end of one vehicle impinges against the side of another, the hook 17 and the lip 19 interlock as seen in FIG. 8 and cause the two vehicles to come to rest as a unit.

A steering column 21 comprises a longitudinal series of spools or sections 23 which are retained in interlocking relationship with one another to form the column 21 as a unit under the tension of a cable 25. When the passenger compartment 13 is caused to separate from the chassis 12, the tension cable 25 is released and the steering column 21 disintegrates into its several individual spools or sections 23. Thus, the steering column is removed as a hazard to the body of the driver when a high speed impact occurs.

The vehicle construction is particularly adapted to automotive applications and will be described with relation thereto, although it has, of course, numerous other applications, such as air-borne vehicles and other passenger transporting conveyances.

More specifically, as seen in FIG. 1, the chassis 12 of the vehicle includes a front end 27 having typically a hood, engine, headlights, grill and other elements of a automobile. The rear end 29 of the chassis 12 includes the usual space for luggage, spare tires, tools, etc. Intermediate the front and rear ends of the chassis there is formed a cradle 31, which lies generally longitudinally of the chassis 12.

The passenger compartment 13 is firmly secured to the cradle 31 by securing elements 33, which are adapted to release the passenger compartment at high speed impacts as will be hereinafter more fully described. When the passenger compartment is positioned within the cradle of the chassis, the vehicle appears to be of conventional construction. Minor bumps or collisions at speeds in which seat belts and other safety features of conventional vehicles provide adequate protection do not release the passenger compartment from its fixed position on the chassis. On the occasion of a collision at high speed, however, where the protection afforded by seat belts is insufficient, the passenger compartment 13 is released from the chassis 12 and caused to be separated therefrom by the separating devices 15. When the high speed collision is head-on or is of the type in which one vehicle moving forwardly strikes a fixed object, the passenger compartment 13 is allowed to travel in the direction of movement of the vehicle prior to impact, substantially as disclosed in U.S. Pat. No. 3,162,479, issued Dec. 22, 1964. In this patent is disclosed the disposition of a pair of rails or tracks in the cradle of the chassis. The tracks guide the passenger compartment in its longitudinal movement to prevent diversion of the compartment toward a lateral direction. As will be seen in detail hereinafter, the present embodiment does not so restrict the movement of the passenger compartment, but rather "floats" the compartment, enabling it to respond in a restrained manner to an impingement at substantially any point on the perimeter of the chassis 12.

The operating elements of the vehicle 11, such as the breaks, shift lever and accelerator, all of which require manipulation by the driver, may comprise a hydraulic system with an appropriately placed servomechanism operatively connected to each of the control elements in the passenger compartment by flexible hoses. Such a connection will allow movement of the compartment without loss of control over the functions operated by these elements. The steering column 21, on the other hand, is a feature of the present embodiment and will be described in detail hereinafter.

In addition to the features described herein, it is noted that the preferred embodiment may also include a seat (not shown) that will tilt rearwardly in response to a separation of the compartment 13 and the chassis 12, as fully disclosed in U.S. Pat. No. 3,423,124, issued Jan. 21, 1969. Such rearward tilting of the safety seat aides in holding the occupants in place and mitigating the hazards of uncontrolled movement of the occupants' heads and bodies at the time of an impact from any direction and in the absorption of forces imposed on the occupants of the passenger compartment, thus further reducing the chances of injury to the occupants. Because this safety seat is fully disclosed in the foregoing patent, no further description will be provided of it herein.

The provision for separating the passenger compartment 13 from the chassis 12 enables the passenger compartment to respond in restrained movements to the direct force of impact received by the chassis 12. In the instance of a head-on impact, the passenger compartment 13 already has a velocity in the direction of vehicle movement. Hence, upon impact the passenger compartment tends to continue in the direction of movement and the need is for the passenger compartment to absorb this force in a manner which will safely decelerate the movement of the passenger compartment so that it comes to rest without injury to its occupants.

On the other hand, when an impact between two vehicles occurs by one vehicle striking the side of the other vehicle, the forces to be absorbed may include acceleration as well as deceleration. If the struck vehicle was not moving or moving slowly prior to impact, motion is imparted to the passenger compartment and its occupants with an acceleration from a condition of rest or slow movement. If the struck vehicle was rapidly moving prior to impact, there may be a deviation from the direction of velocity and, hence, a component of force having an acceleration in an angular direction to the original direction of movement.

Thus, it is desirable to provide the separating devices 15 with universal mountings so that the passenger compartment 13 may move in any direction relative to the chassis 12. In FIG. 3, one such separating device 15 is illustrated in detail. The universal mounting illustrated is of the ball and socket type, wherein a socket base 35 is securely attached to the passenger compartment 13 on one end of the separating device and to the chassis 12 at the other end by suitable means, such as spot welds 37. Balls 39 at either end of the separating device 15 interfit with the associated socket bases 35 to complete the universal mounting. Thus, it may be seen that the separating device 15 is movable through 360° with respect to each of its mountings. The separating device 15 also is a connecting device between the chassis 12 and the passenger compartment 13. Four such devices are used in the preferred embodiment and are disposed in a manner to provide support similarly as four legs support a table at each corner of a rectangular mounting configuration.

The separating devices 15 serve not only to provide a means of connecting the chassis 12 with the passenger compartment 13 but also to provide means for lifting the passenger compartment off the cradle 31 of the chassis 12 and as means to absorb the kinetic energy imparted to the passenger compartment. Each separating device 15 is connected in common into a suitable hydraulic system (not shown) by hoses 41. The hoses 41 are connected to either end of a hollow cylinder 43 closed at both ends. This is illustrated by the hose 41a at the top end of the cylinder and the hose 41b at the bottom end of the cylinder. Movable within the hollow cylinder is a piston 45 connected to a piston rod 47. A suitable hydraulic fluid 49 fills the hollow cylinder 43 on either side of the piston 45. When pressure is exerted on the fluid in the hose 41b, the piston 45 is moved upwardly toward the passenger compartment 13. It is well known, of course, that hydraulic fluid does not compress. Thus, the fluid on the upper side of the piston 45 will exit through hose 41a and return to the hydraulic system as the piston 45 moves upwardly in the cylinder 43.

Two compression springs 51 and 53 are disposed in surrounding relationship to the piston rod 47 in the upper portion of the cylinder 43. The spring 51 is a long compression spring and is always in contact with the upper surface of the piston 45 as it slidably moves within the cylinder 43. An important purpose of this spring is to return the piston 45 to its normal (lower) position when the pressure in hose 41b is reduced. The spring 53 is shorter than the spring 51 and is stronger. A substantially greater force is required to compress the spring 53 than is required to compress the spring 51. One purpose of the spring 53 is to provide an element on which work must be done and, hence, energy expended after the passenger compartment 13 is separated from the chassis 12. Thus, the spring 53 is of such a length as to allow sufficient movement of the piston 45 to separate and raise the passenger compartment 13 from the chassis 12 before compressive contact is made with the spring and energy is expended to compress it.

After separation, the separating device 15 becomes an energy absorbing device and provides restrained movement of the passenger compartment 13 to which it is connected. The restraint is predetermined to provide controlled deceleration in the direction of the velocity attained in the movement of the passenger compartment 13 after an impingement upon the chassis 12.

Energy is thus expended in the compression of the springs 51, 53 during the accompanying upward movement of the piston 45, which compresses the springs between the closed end of the upper cylinder and the piston. The energy is expended in two principal ways. One is in the conversion of the energy to heat by friction in deformation of the springs. The other is by storing energy in the compressed springs. Because energy is thus stored, upon reaching the compressed position the springs will have potential energy and immediately urge restoration of the energy so stored to the system by urging the piston 47 downwardly.

By virtue of the connections of the separating devices 15 to both the passenger compartment 13 and the chassis 12, the passenger compartment will move back toward its normal position of rest. The direction of this movement is opposite to the initial direction, and so the occupants of the passenger compartment would have an acceleration in the reverse direction immediately following the deceleration in the initial direction. Normally, this would impart a strain on the passengers which could cause injury if the rate of acceleration were of sufficient magnitude. The movement of the piston 45, however, in the downward direction causes a reversal of the flow of the hydraulic fluid 49 in the hydraulic system. Thus, between the energy dissipated in the work expended in returning the hydraulic system to its normal condition and the energy converted to heat by virtue of the restricted fluid passages, the acceleration in the reverse direction is diminished so that a smooth movement is accomplished in returning the system to neutral. Moreover, the inertial force of the occupants upon their seats in the passenger compartment also provides energy absorption and assists in reducing the effective forces directly on the occupants.

Upon the absorption of the energy stored in the springs 51, 53 by the velocity of the passenger compartment and its occupants in compressing the springs, the velocity has been reduced to zero and the kinetic energy of the compartment and its occupants has been safely converted to heat without undue forces which would normally cause serious or fatal injuries.

Although, as mentioned previously, the hydraulic fluid 49 is not compressible, it is preferred for use in the illustrated embodiment since it will cause a direct result by an immediate response to the actuating devices.

In the preferred embodiment of the present invention, these actuating devices are in the form of actuating cylinders 55, as best seen in FIG. 5. These actuating cylinders are generally as illustrated in detail in FIG. 3, except that the compression springs would be on the reverse side of the piston 45 and the normal position of the piston would be toward the piston rod end of the cylinder. Thus, initial actuation of the cylinder is by a force exerted against the piston rod 47 such that the piston 45 is caused to slide toward the end of the cylinder opposite the rod end to move the hydraulic fluid out of a hose (not shown) corresponding in position to the hose 41b of FIG. 3. During such movement of the actuating piston in the cylinder 55, the pressure in hose 41b of the separating device 15 increases, and the piston 45 of the cylinder 43 moves upwardly against the weight of the passenger compartment 13 and the restraining force of the securing elements 33. The securing elements 33 are adapted to release at a predetermined force. Thus, any force less than the predetermined force will not cause separation of the passenger compartment 13 from the chassis 12. One skilled in the art may determine the force at which it is preferred for the passenger compartment and the chassis to separate. Such a determination preferably takes into consideration the speeds at which safety belts and other safety features of conventional vehicles provide adequate protection for the occupants and thus avoids separation by minor bumps or collisions.

It should be noted that although a hydraulic system is used in the preferred embodiment for separating the passenger compartment 13 from the chassis 12, it is not the only available means for causing such separation. Direct mechanical means employing lever arms and springs and electrical implementation of a measured explosive or a rapidly burning composition in sealed cylinders with piston shafts are examples of other means. The innovation discussed in this application relates primarily to the freeing of the passenger compartment from the chassis at the impingement of a force against the chassis at substantially any point around the perimeter thereof, the relation of the free passenger compartment to the chassis, and the restraining of the passenger compartment in this relationship.

Another feature of the present embodiment is illustrated in FIGS. 4–8 wherein means are employed for interlocking two vehicles that collide with each other so that they may come to rest as a unit after the collision. Thus, the frictional forces of both vehicles are available to bring the unit to rest. Further, the hazard caused by the bouncing effect to persons occupying the vehicles is greatly diminished. This bouncing effect occurs normally when two vehicles collide and then separate in an unpredictable fashion from each other, resulting in the occupants of the vehicles being impelled first in one direction and then another.

In FIG. 4, there is shown the front end 27 of the vehicle according to the preferred embodiment of the present invention. A bumper 57 is mounted to the front end 27 by mounting elements 58 (FIG. 5), which are of suitable construction and material to permit restrained movement rearwardly of the bumper when a force is applied thereto from the front and then to return the bumper to its original position after release of the force. Preferably, at least two openings 59 are provided through the bumper 57. Immediately behind each of the openings 59, as may be seen in FIG. 6, is the interlocker hook 17. This hook is secured in a suitable manner to the chassis 12 and maintains a fixed relation thereto such that when the bumper 57 is caused to move rearwardly, as indicated in phantom in FIG. 6, the front portion of the hook 17 is inserted through the opening 59 and becomes a protuberance in front of the bumper 57. The opening 59, of course, is of a size and shape to permit such insertion. The front portion of the hook 17 includes a nose 61, a separator bar 63 inclined rearwardly and upwardly from the nose, a lock slot 65 for engaging the interlocker lip 19 (FIG. 7), a cam follower surface 67 intermediate the nose and the slot, and a shoe 69 adjacent the slot. It should be understood that although one hook centered behind the bumper 57 may be sufficient to accomplish the interlocking of the vehicles, it is preferable to have more than one hook spaced across the front of the vehicle. For purposes of illustration, two are shown. There may, of course, be more.

The portion with which the interlocker hook 17 engages is best seen in FIG. 7, wherein a partial view in section of the side of the vehicle 11 is seen. The chassis 12 terminates in an upwardly extending interlocker lip 19. Spaced above the lip 19 is the lower portion of the passenger compartment 13. An opening 70 between these two elements is adequate to allow entry therethrough of the nose 61 plus permitting a tolerance for differentials in levels between vehicles. In this connection, it is preferable that a standardization be established whereby the vehicles would have bumper compatability, and only the usual tolerances to accommodate slight variances between vehicles plus a safety tolerance need be provided for. Preferably, a facing 71 covers the opening 70, giving the appearance of a conventional vehicle. This facing may be of any suitable material, such as plastic, that will break upon impact and permit entrance of the hook 17 through the opening 70. As is best illustrated in FIG. 8, the nose 61 enters the opening and the separator bar 63 thereafter engages the lower portion of the passenger compartment 13, which is reinforced (not shown) in a suitable manner. At approximately the same time, the cam follower surface 67 engages the interlocker lip 19. Both surfaces are inclined; the bar 63 being inclined upwardly and the cam follower surface 67 being inclined downwardly. Thus, a wedging action occurs as the hook 17 is thrust through the opening 70. This wedging assists in the separation of the passenger compartment from the chassis. The lip 19 falls into the slot 65 and is prevented from any further movement with respect thereto by the shoe 69. The hook 17 and the lip 19 thus become completely engaged, and the two vehicles are then interlocked to come to rest as a unit.

During this interlocking, the nose 61 accomplishes a further purpose. It will be noted in FIG. 7 that disposed inwardly of the opening 70 is a movable actuator bar 73. Against the inner surface of the actuator bar 73 is the extended distal end of the piston rod 47 of the actuating cylinder 55. As the nose 61 progresses inwardly against the actuating bar 73, the piston rod 47 is moved inwardly of the cylinder 55. It will be noted in FIG. 8 that when the complete engagement between the lip 19 and the slot 65 are accomplished, the piston rod 47 is in its fully depressed position within the actuating cylinder 55. This condition occurs when the impinging force is at least the predetermined amount, as mentioned previously, that will cause the securing elements 33 (FIG. 1) to be released. Otherwise, if the impinging force is not as great as the predetermined releasing force, the piston rod 47 is not permitted to travel its entire length and the vehicles will not interlock. It will be recalled that the purpose of predetermining a force sufficient to cause separation of the passenger compartment from the chassis is to permit a margin for minor impacts in which there is no separation. The usual safety devices provided with the vehicles, such as seat belts and padded dashboards, are sufficient to protect the occupants at these lower forces.

As may be seen in FIG. 5, the actuating cylinders are securely mounted to a frame 75 of the chassis 12. These actuating cylinders are spaced apart around the perimeter of the chassis, although only a few representative cylinders are illustrated in FIG. 5. The actuating cylinders 55 along any one side are aligned so that the distal ends of the piston rods 47 in their extended (normal) position are adjacent the inner surface of the actuating bar 73. Thus, the nose 61 can strike the bar at substantially any point along the width of the car and at least one actuating cylinder 55 will be affected. The actuating cylinders 55 on the front of the car are actuated by the depression of the bumper 57, and those on the rear of the car (not shown) are actuated by a similar movement of the rear bumper.

The rear bumper (not shown) may be adapted to provide an interlocker lip similar to the interlocker lip 19 so as to have a portion with which the hook 17 may engage to interlock the two automobiles when a rear end collision occurs. For example, the upper portions of the bumper may be of less strong material to permit the encroachment of the hook 17 thereupon. In a similar manner, the front bumper 57 may be adapted to interlock with the hook 17. Thus, interlocking of vehicles may occur when one vehicle impinges against another at substantially any point around the perimeter of the other vehicle, and such impingement will cause separation of the passenger compartment from the chassis.

A further feature of the present embodiment is a provision for removing the steering wheel from its normal position so that the driver is not forced abruptly against it at the time of a collision of sufficient force to separate the passenger compartment 13 from the chassis 12. Such a removal of the steering wheel is accomplished by providing a steering column that disintegrates into its separate elements at the time the passenger compartment starts its upward movement in separating from the chassis.

A schematic of such a steering column is illustrated in FIG. 9, wherein the column 21 is comprised of a plurality of sections 23 held together under tension by a cable 25. A detail of the spool-like section 23 is illustrated in FIG. 10. A pair of tongues 77 at one end of the section 23 are adapted to interfit with a pair of grooves 79 in the other end of the section. Thus, when the sections are assembled, there is an interlocking relationship between the sections, and this relationship is maintained by a tension provided by the tension cable 25. A bore 81 is provided through each of the sections 23. Through this bore, the tension cable 25 is threaded. The cable 25 is suitably secured at the steering wheel end of the column and is pulled taut at the other end to retain the assembly under tension. The tension on the cable 25 is then released when the passenger compartment 13 separates from the chassis 12.

Releasing the tension may be accomplished in any number of suitable ways. For example, the end of the cable may be secured to the piston rod of one of the separating devices 15 through a series of cable guides. When the piston is in its normal (lower) position, the cable will be taut, and when the piston rod moves upwardly in separating the passenger compartment 15 from the chassis, the tension will be released. Loss of tension, weight of the steering wheel, and the angle at which the steering column is disposed all combine to allow the steering column to disintegrate into its several elements.

It should be understood that the construction just described is for illustrative purposes only. There may be other suitable constructions which could provide a steering column that would disintegrate into its several elements upon the separation of the passenger compartment from the chassis. In the illustrated construction, it is not the force of the driver's body that causes the disintegration of the steering column since the force holding the steering column as a solid body is released prior to the time the driver's body would strike it. It is recognized, of course, that the movement of the driver's body is very fast and the time period between impact and the reaction to it of the driver's body is very short. Yet, the steering column does not depend upon the force of a human body to cause its collapse. The driver's body may be in contact with the steering wheel as the steering column is breaking up into its several elements, but such contact is of relatively minor force.

An alternative embodiment is seen in FIG. 11. This embodiment incorporates the separating devices 15 as earlier disclosed herein and shock cushioning elements 16 similar to those disclosed in U.S. Pat. No. 3,162,479, issued Dec. 22, 1964. This combination is particularly suitable for protection of the occupants of the passenger compartment 13 immediately following a head-on impact, such as an impact of the vehicle 11 with a fixed object, illustrated in the form of a tree 83 or a head-on collision between two vehicles (not illustrated). In such an instance, the primary forces to be absorbed are longitudinally of the vehicle 11. Since the possibility of extremely high impact forces may be in the longitudinal direction, the longer the path of restrained movement of the passenger compartment after impact, the more time permitted for deceleration. The total force would then be spread over a period of time so that the maximum instantaneous force imposed upon the occupant's body would be, therefore, significantly reduced, and the chances for survival would be substantially improved.

Contributing toward the longer time for deceleration is the upwardly curved path of restrained movement of the passenger compartment 13 upon impact. As will be seen in FIG. 11, the forward end 85 of the passenger compartment is caused to be directed upwardly as well as longitudinally forwardly upon separation from the chassis 12. This upward movement of the passenger compartment does absorb or convert a portion of the kinetic energy of the forward movement into work in elevating the compartment. The amount, however, of the energy so transformed is insufficient to adequately decelerate the passenger compartment at a safe rate for the occupants. Therefore, a shock cushioning element 16 is provided to absorb the remaining kinetic energy and reduce the velocity of the passenger compartment to zero at a rate of deceleration which substantially mitigates the force applicable to the occupants of the passenger compartment. Preferably, more than one is provided. In the present embodiment, a pair is provided near the front and another pair is provided near the rear of the passenger compartment 13.

The shock cushioning element 16 is shown in detail in FIG. 12. The element 16 is hingedly connected to the chassis 12 of the vehicle 11 by a pin 87 and to the passenger compartment 13 by a pin 89. These hinged connections allow the shock cushioning element 16 to pivot about the connections as the passenger compartment 13 moves forwardly. The shock cushioning element 16 comprises a pneumatic absorbing unit 91 having a hollow cylinder 93 closed at both ends, a piston 95 positioned within the cylinder and slidable therein, and a piston rod 97 passing through the end of the cylinder 93 opposite the piston end and connected to the piston 95. The piston 95, positioned at the end of the rod 97, contains a plurality of orifices 99 extending therethrough parallel to the longitudinal axis of the rod 97. The orifices are sized to allow restricted passage of the air therethrough to provide communication between the space within the cylinder disposed on either side of the piston 95. When the passenger compartment 13 is positioned in normal relation to the chassis 12, the piston 95 is positioned adjacent the end of the cylinder nearest the point of connection to the chassis.

Upon a high speed impact of the vehicle 11 and the subsequent forward movement of the passenger compartment 13 and the occupants therein with respect to the chassis 12, the rod 97 connected to the passenger compartment 13 is also caused to move longitudinally in the direction of movement of the compartment. This movement causes the piston 95 to travel through the cylinder toward the end furthest from its connection to the chassis, thus compressing the air enclosed between that end and the piston. As the air is compressed, it is caused to pass through the orifices 99. This passage converts the kinetic energy of movement of the passenger compartment into heat and decelerates the passenger compartment and its occupants during the forward travel of the compartment.

At extremely high speed impacts, the attendant energy dissipation achieved in the shock absorbing piston and cylinder arrangement is boosted by an energy storing device in the form of a spring 101 provided in the cylinder 93 between the end through which the rod 97 is passed and the piston 95. Upon impact and forward movement of the passenger compartment and the accompanying forward movement of the piston 95, the energy storing spring 101 is compressed. This compression stores energy in the spring and further reduces the deceleration rate of the passenger compartment and its occupants. After reaching the compressed condition, the spring 101 will urge immediate restoration of the stored energy to the piston 95. Such urging causes the piston to move toward the chassis end of the cylinder. By virtue of its connection to the passenger compartment 13 through the rod 97, the passenger compartment is moved in the direction opposite to the direction of travel of the vehicle prior to impact. The movement of the piston 95 in the reverse direction, however, causes compression of the air between the piston and the closed end of the cylinder nearest the chassis 12. The stored energy of the spring is therefore converted to heat by virtue of the restricted passages of the air through the orifices 99.

As an alternative, the forwardmost pair of the shock cushioning elements 16 could be of the type disclosed in U.S. Pat. No. 3,162,479 in which a stretchable cable is employed between the forward end of the passenger compartment and the shock cushioning element. Because of the detailed description in that patent, no further description of that type of element will be provided herein.

To permit the longitudinal movement just described of the passenger compartment 13 and the restraining thereof by the shock cushioning elements 16, the separating devices 15 are adapted to release the passenger compartment. Thus, in this instance the separating devices 15 perform only the function of separating the passenger compartment from the chassis 12. The manner in which the release is accomplished is best seen in FIG. 13 wherein special end plates 103 are releasably connected to the ends of the mounting bases 35 such that a force in the longitudinal direction will cause the ball 39 to remove the end plate 103 against which it acts. This action accommodates the separation of the ball 39 from its base 35, thus releasing the separating device 15 from its connection to either the passenger compartment 13 or the chassis 12 or both. Providing the end plates 103 on the bases 35 at either end of the separating device 15 insures the breaking of the separating device 15 connection between the passenger compartment 13 and the chassis 12 when a sufficient longitudinal force is applied. The end plates 103 may be connected to the base 35 by any suitable releasable means, such as by shear bolts 105. Appropriate selection of the shear bolts predetermines the force which will be required to cause separation of the end plates 103 from their respective bases 35 and, hence, the release of the separating elements 15 from the bases.

In summary, a safety construction for vehicles has been provided which effectively reduces the forces imposed upon occupants of the vehicles due to extreme high acceleration and high deceleration rates incident to high speed collisions between vehicles. Upon impact of one vehicle against another at substantially any point around the perimeter of the other, the passenger compartments 13 of each vehicle will be separated from its respective chassis 12 if the impact is at least of a predetermined force. Such a force overcomes securing elements 33 integrating each passenger compartment and its chassis. Separating elements 15 raise each of the passenger compartments and permit each compartment to move in a restrained manner independently of its respective chassis. The restrained movement of the passenger compartment reduces the forces acting upon the occupants of each compartments. An alternative embodiment provides pneumatic shock cushioning elements 16 which permit a longer path of movement of the passenger compartment in the longitudinal direction. The longer path allows a longer time for decelerating the passenger compartment. This mitigates the hazardous forces acting on the bodies of the occupants. In this instance, the separating elements relinquish restraint of the passenger compartment to the shock cushioning elements 16.

Further, interlocking devices are provided to interlock colliding vehicles so that they come to rest as a unit, thus reducing the bounce effect between the vehicles.

A sectioned steering column held together under tension is also provided. Upon separation of the passenger compartment from the chassis, tension is released from the steering column and it disintegrates into its several elements. The steering column does not depend upon the force of the driver's body against it to cause this disintegration.

Thus, it is apparent that there has been provided, in accordance with the invention, a safety construction for vehicles. While the invention has been described in conjunction with specific embodiments thereof, it is evident that many alternatives, modifications, and variations will be apparent to those skilled in the art in view of the foregoing description. Accordingly, it is intended to embrace all such alternatives, modifications and variations as fall within the spirit and scope of the appended claims.

Various features of the invention are set forth in the following claims.

What is claimed is:

1. In a safety construction for vehicles, the combination comprising a vehicle having a chassis, a passenger compartment releasably secured to said chassis, automatic means for separating said passenger compartment from said chassis upon an impact of at least a predetermined force at substantially any point around the perimeter of said chassis, and connecting means between said compartment and said chassis to restrain said compartment in its movement relative to said chassis upon separation therefrom, said separating means and said connecting means comprising a hydraulic system, a plurality of cylinders in said hydraulic system, and universal mounting connections at either end of said cylinders for attaching same to said compartment and said chassis for permitting relative movement of said compartment in any direction with respect to said chassis upon separation therefrom, each of said cylinders including a first compressible spring constantly in contact with and urging the piston of the cylinder to its normal position and a second compressible spring shorter than said first spring and having a greater resistance to compression than said first spring, whereby said piston contacts said second spring after said compartment has separated from said chassis and said second spring becomes useful in restraining the movement of said compartment relative to said chassis.

2. Apparatus in accordance with claim 1 wherein said hydraulic system further includes a plurality of actuating cylinders disposed in alignment and spaced apart around and inwardly adjacent the perimeter of said chassis and wherein said separating means further includes a plurality of actuating bars, one of said bars being movably mounted along each side of said perimeter outwardly adjacent the distal end of the piston rods of said aligned actuating cylinders when the rods are in their normal, fully extended position, whereby an impingement at any point along the bar will depress at least one of said rods and actuate said separating means when the impingement is of at least said predetermined force.

3. Apparatus in accordance with claim 1 further comprising a sectioned steering column and tension means for retaining the sections in interlocking relation longitudinally of each other to form the column as a unit, said tension means releasing the sections upon separation of said compartment from said chassis causing said column to disintegrate into its several sections, whereby said steering column is removed as a hazard to the body of the driver.

4. Apparatus in accordance with claim 1 wherein said universal mounting connections comprise releasable plates for accommodating separation of said connections when the direction of forces acting against said connections are longitudinally of the vehicle, and said apparatus further comprising additional connecting means and shock cushioning elements carried thereby for connecting said chassis and said passenger compartment so as to restrain movement of the passenger compartment longitudinally of the chassis when said mounting connections of said cylinders are separated.

5. Apparatus in accordance with claim 4 wherein said shock cushioning elements are adapted to dissipate the kinetic energy of said compartment and reduce the velocity thereof to zero at a rate of deceleration substantially slower than the rate of deceleration of said chassis upon impact.

6. Apparatus in accordance with claim 4 wherein said shock cushioning elements comprise at least one shock absorber including a hollow cylinder closed at each end and connected to said chassis adjacent one end of said cylinder, a piston containing at least one orifice adapted to allow passage of air therethrough slidably positioned within said cylinder, and a piston rod connected to said compartment, whereby movement longitudinally of said chassis causes said piston to move toward one end of said cylinder compressing the air contained therein and causing said air to pass through said orifice to convert the kinetic energy of the passenger compartment into heat and reduce the velocity of said compartment to zero at a deceleration rate which diminishes shock to the occupants of said compartment.

7. Apparatus in accordance with claim 1 further comprising hook means near the front of said vehicles and lip means around substantially the perimeter of said vehicles, said hook means disposed with respect to said lip means to interlock therewith when the front of one of said vehicles impinges against substantially any point around the perimeter of another of said vehicles, whereby said vehicles become interlocked to come to rest as a unit following said impingement.

8. Apparatus in accordance with claim 7 wherein said hook means has a nose and a portion inclined upwardly and rearwardly therefrom to assist in separating said compartment from said chassis upon said impingement.

9. Apparatus in accordance with claim 7 further comprising a movably mounted front bumper and wherein said hook means is disposed in a fixed position rearwardly of said front bumper so that the normal position of the forwardmost portion of said hook means is rearwardly adjacent an opening in said bumper, said opening being of size and shape to permit insertion therethrough of said hook means, whereby said hook means becomes a protuberance forwardly of said bumper when said bumper impinges against an object and is moved rearwardly.

* * * * *